United States Patent [19]

Zankl

[11] 4,261,675

[45] Apr. 14, 1981

[54] MACHINE TOOL WITH PULSATING CUTTING FORCE

[75] Inventor: Frank Zankl, Brookfield, Wis.

[73] Assignee: Kearney & Trecker Corporation, West Allis, Wis.

[21] Appl. No.: 966,893

[22] Filed: Dec. 6, 1978

[51] Int. Cl.³ .......................... B23C 9/00; B23Q 5/02
[52] U.S. Cl. .................................. 409/196; 409/141; 409/156
[58] Field of Search ............... 409/196, 183, 141, 191, 409/193, 194, 132, 156, 64, 131; 408/17, 1; 51/165.8, 77; 83/593

[56] References Cited

U.S. PATENT DOCUMENTS

| 2,309,637 | 2/1943 | Fickett et al. ........................ 409/156 |
| 2,891,426 | 6/1959 | Martin et al. ..................... 409/131 X |
| 3,504,581 | 4/1970 | Weichbrodt et al. ................. 409/141 |
| 4,052,132 | 10/1977 | Oates ................................... 408/1 R |
| 4,056,137 | 11/1977 | Morasch ........................... 409/132 X |

FOREIGN PATENT DOCUMENTS

| 466682 | 7/1950 | Canada ........................................ 408/1 |
| 1084455 | 9/1967 | United Kingdom ...................... 408/9 |
| 457548 | 3/1975 | U.S.S.R. .................................... 408/17 |
| 476099 | 7/1975 | U.S.S.R. .................................... 408/17 |
| 567555 | 8/1977 | U.S.S.R. .................................... 408/17 |

Primary Examiner—William R. Briggs
Attorney, Agent, or Firm—Cyril M. Hajewski; Robert B. Levy

[57] ABSTRACT

The cutting force applied between the cutting tool and the workpiece of a machine tool is periodically pulsated to expedite removal of material from the workpiece. The periodic cutting force pulsation is produced by periodically varying the spindle speed or the feed rate or both. In one embodiment, the periodic speed variation is produced by universal joints in the spindle drive and worktable drive. In a second embodiment, the periodic speed variation is produced by elliptical gears in the spindle drive and worktable drive.

2 Claims, 13 Drawing Figures

THIS SKETCH IS SHOWN WITH SHAFTS AT 0° ANGLE ROTARY POSITION

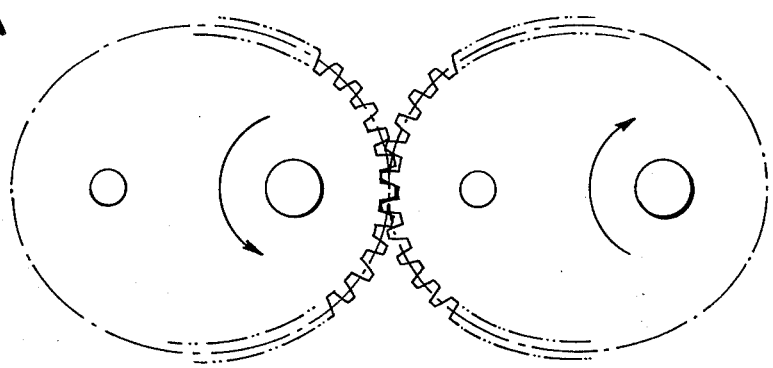
FIG. 4A
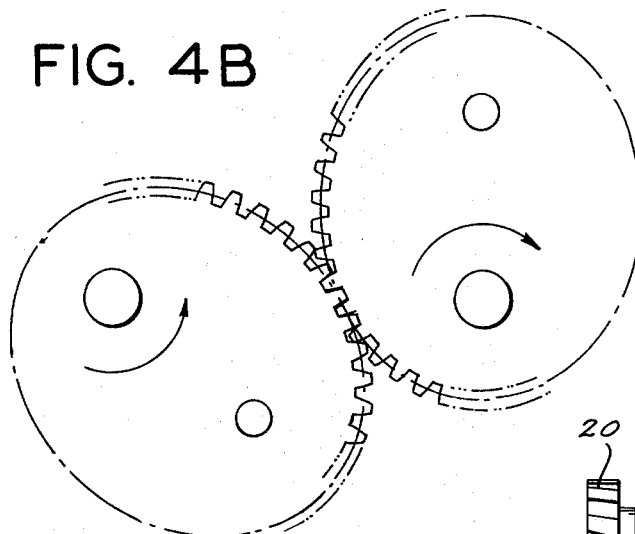
FIG. 4B
FIG. 5
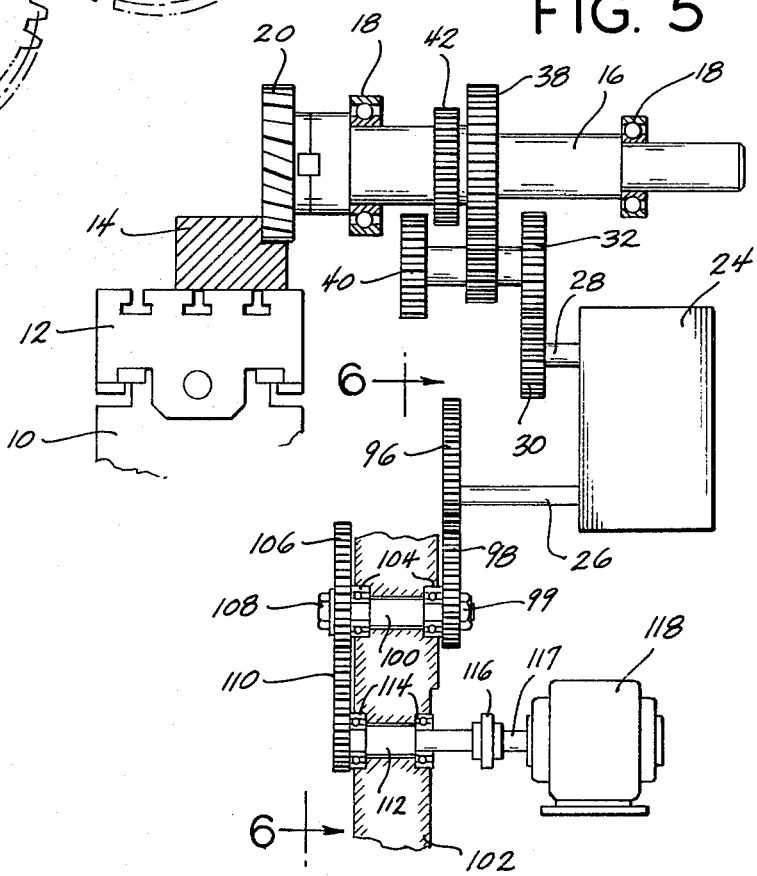
FIG. 6
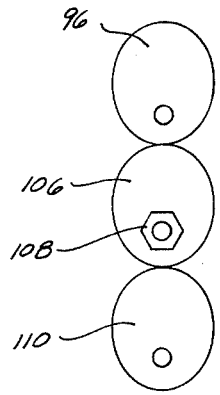

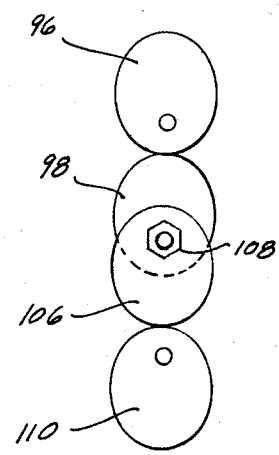
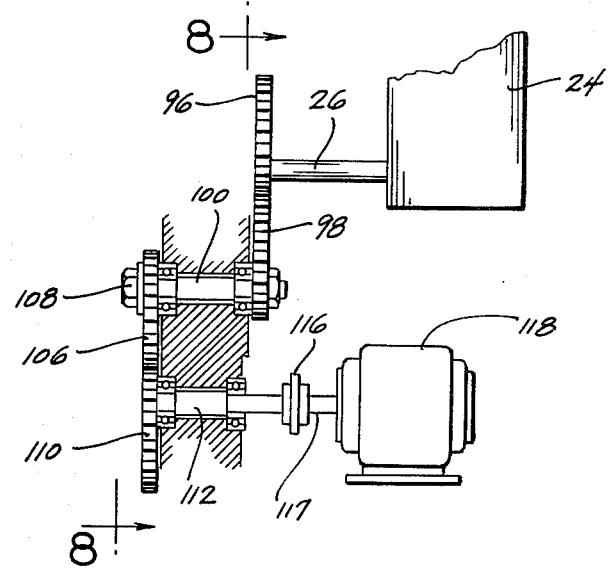
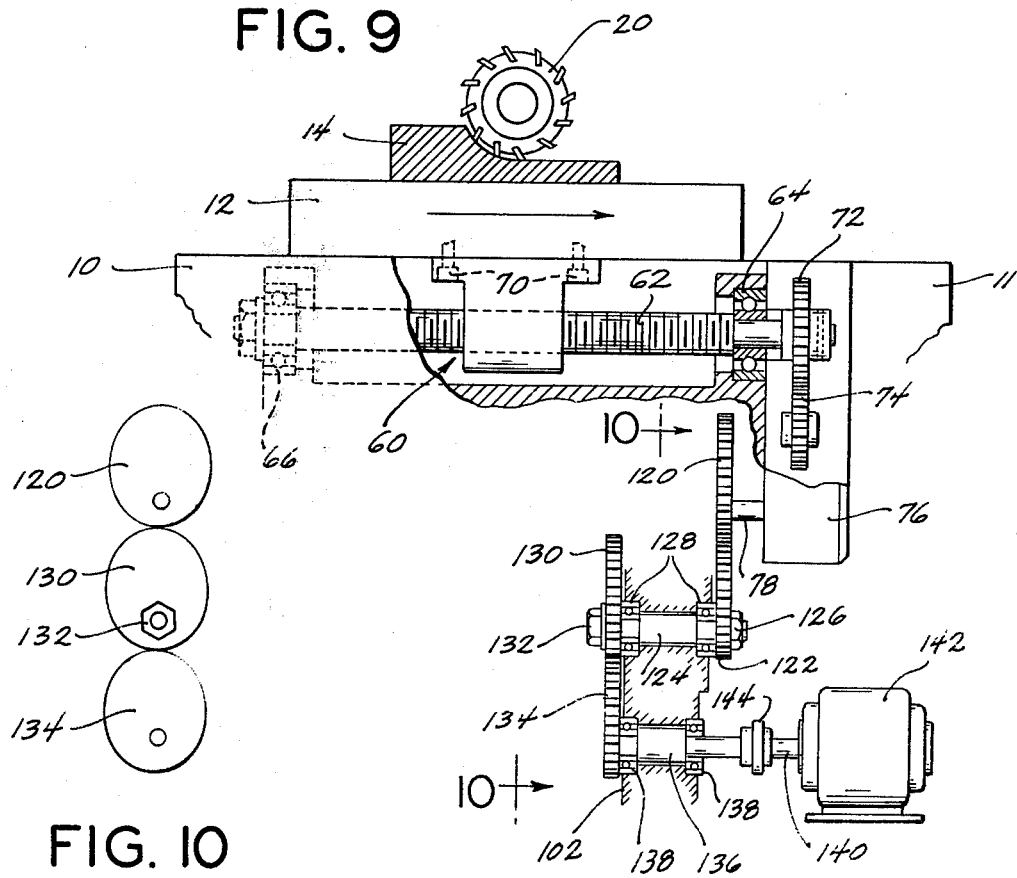

MACHINE TOOL WITH PULSATING CUTTING FORCE

BACKGROUND OF THE INVENTION

This invention relates to machine tools. In the past, machine tools employed a relatively constant cutting force between the cutting tool and the workpiece. The principle object of this invention is to provide an improved machine tool which utilizes a pulsating cutting force between the cutting tool and the workpiece. Other objects and advantages of the invention will be apparent from the detailed description herein.

SUMMARY OF THE INVENTION

The cutting force between the cutting tool and workpiece of a machine tool is periodically pulsated by periodically varying either the rotary speed of the cutting tool or the feed rate or both. The invention also includes a novel pulsating drive utilizing adjustable elliptical gears.

DESCRIPTION OF THE DRAWINGS

FIG. 4A shows the pitch circles of two meshing elliptical gears;

FIG. 4B shows the elliptical gears of FIG. 4A in a different angular position;

FIG. 5 is a diagrammatic side elevational view of a second preferred embodiment of the invention utilizing elliptical gears;

FIG. 6 is a fragmentary front elevational view taken on the line 6—6 of FIG. 5;

FIG. 7 is a fragmentary side elevational view of the elliptical gears of FIGS. 5 and 6 in a different relative position;

FIG. 8 is a fragmentary front elevational view taken on the line 8—8 of FIG. 7;

FIG. 9 is a diagrammatic front elevational view of the embodiment of FIG. 5; and FIG. 10 is a fragmentary front elevational view taken on the line 10—10 of FIG. 9.

DESCRIPTION OF THE PREFERRED EMBODIMENTS

Figure 1:
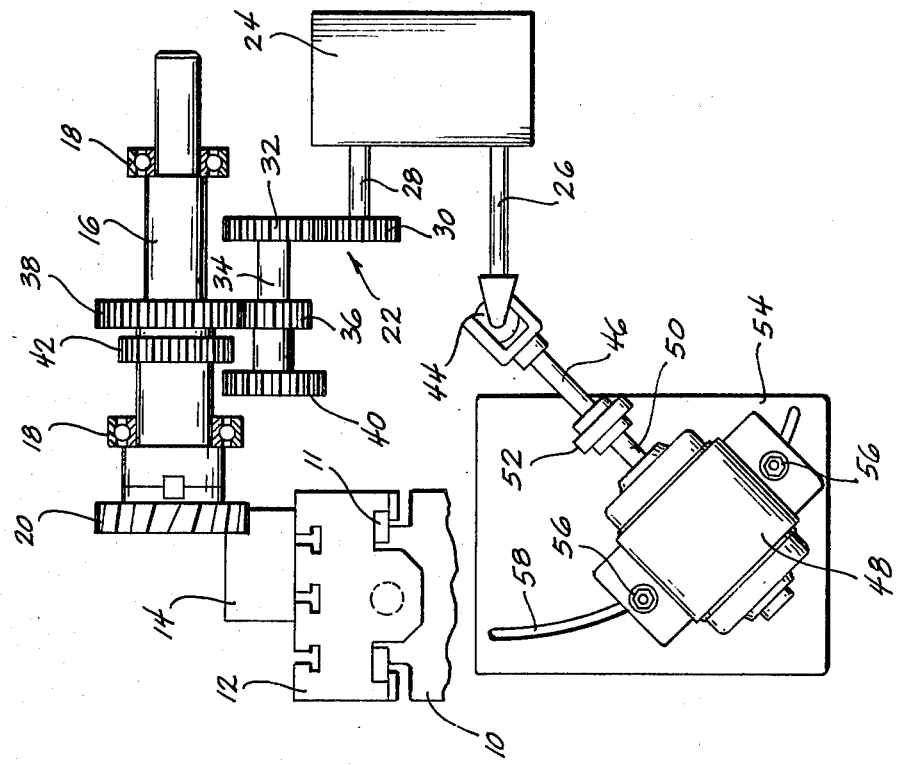
FIG. 1 is a diagrammatic side elevational view of a preferred embodiment of the invention.

FIG. 1 is a diagrammatic side elevational view of an embodiment of the invention which includes a machine tool bed 10, a worktable 12 slidably mounted on bed 10 by means of ways 11, a workpiece 14 clamped on worktable 12, a spindle 16 rotatably mounted on bed 10 by conventional means which includes bearings 18 and other structural elements not shown, a milling cutter 20, and spindle drive means 22. Spindle drive means 22 includes a speed change gear box 24 with an input shaft 26 and an output shaft 28. Output shaft 28 has a gear 30 attached thereto which drives a gear 32 on drive shaft 34 which drives spindle 16 through conventional range change gears 36, 38, 40 and 42. Input shaft 26 is attached to a universal joint 44 which is driven by a shaft 46 coupled to the output of an electric motor 48. Shaft 46 is coupled to motor shaft 50 by coupling 52.

Motor 48 is mounted on a swivel base 54 and is clamped thereto by bolts 56 which extend through an arcuate slot 58 in swivel base 54 and permit the angle $\beta$ between shafts 26 and 46 to be varied.

Figure 3:
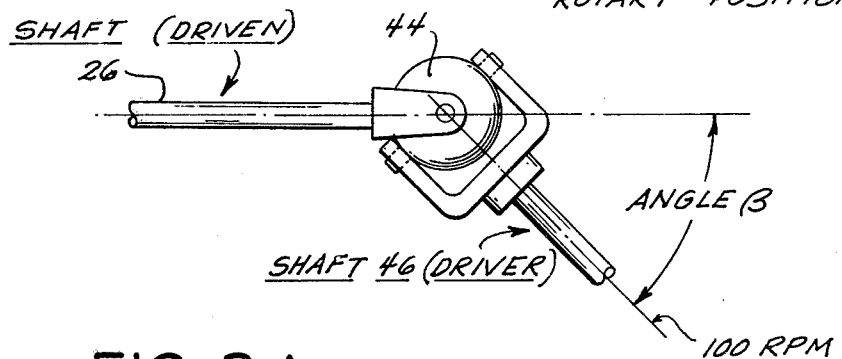
FIG. 3 shows a universal joint with the two shafts thereof disposed at an angle to each other.
Figure 3A:
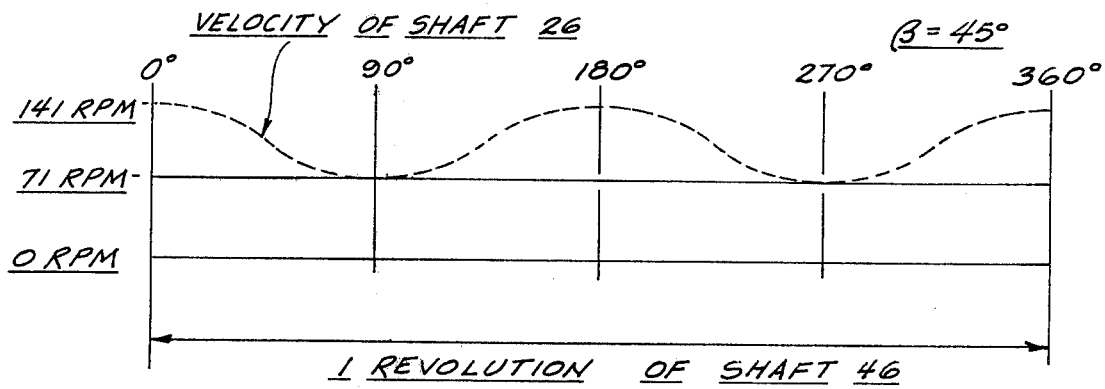
FIG. 3A is a graph of the velocity of the driven shaft of FIG. 3 for one revolution of the driver shaft thereof with a 45 degree angle between the shafts.
Figure 3B:
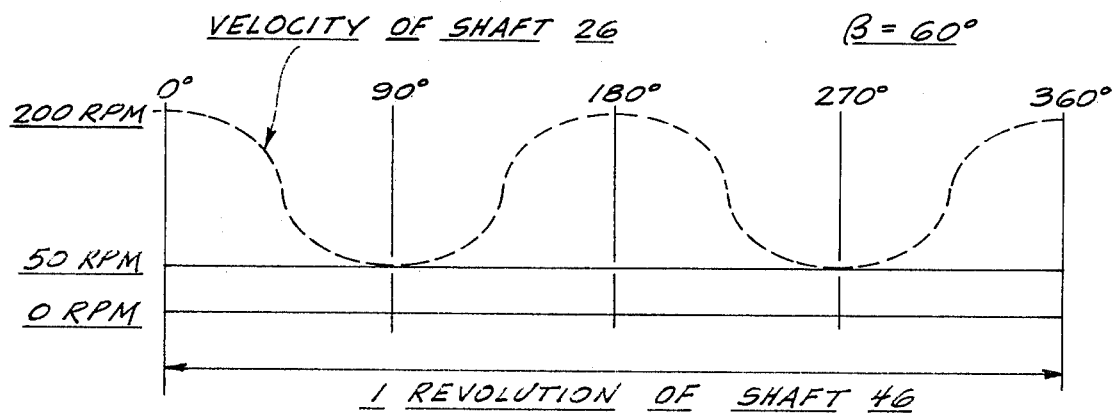
FIG. 3B is a graph of the velocity of the driven shaft of FIG. 3 for one revolution of the driver shaft thereof with a 60 degree angle between the shafts.

When motor 48 is energized, it rotates shafts 50 and 46 at a constant speed which causes shaft 26 to be driven at a pulsating speed due to the angle $\beta$ between the driver shaft 46 and driven shaft 26 of universal joint 44. The pulsating speed of driven shaft 26 is shown on the graphs of FIGS. 3A and 3B for two different values of the angle $\beta$. For each revolution of driver shaft 46, the speed of driven shaft 26 undergoes two speed pulsations between a maximum and minimum speed which are determined by the speed of driver shaft 46 and the value of the shaft angle $\beta$. The maximum and minimum speeds for a driver velocity of 100 RPM and a shaft angle $\beta$ of 45 degrees are shown in FIG. 3A. The maximum and minimum speeds for a driver velocity of 100 RPM and a shaft angle $\beta$ of 60 degrees are shown in FIG. 3B.

It will be understood by those skilled in the art that periodically varying the cutter velocity produces a periodic pulsation in the cutting force. The way in which this periodic pulsation in the cutting force expedites the removal of material from the workpiece can be illustrated by considering the following analogy. Assume a situation where a bead of metal has been left on the seam of the joint where two metal members have been butt welded. It is desired to remove the bead with a cold chisel and hammer. The sharp edge of the chisel is placed in angular contact with the weld bead and is struck by the hammer. After a repeated series of hammer blows the bead is removed by this intermittent impact process. It is obvious that the amount of force used in each hammer blow is quite high in amplitude but of extremely short duration. If this force were integrated over a period of time, the value of the average constant force would be very small. If the cold chisel were now placed in contact with the weld bead with this constant average force applied thereto, it could not penetrate the weld bead. In effect, it can be noted that when the hammer blows were used against the chisel, the force of acceleration imparted by the hammer blows gave the process an advantage.

In a similar fashion, this invention utilizes a pulsating cutting force between the workpiece and the cutting tool. In the spindle drive described above, the spindle is revolved at a variable velocity which changes several times during one revolution at a variable velocity which changes several times during one revolution of the cutter. This, of course, results in intermittent periods of acceleration of the cutter teeth as they feed into the metal block. The cutting force is intermittently increased and decreased in the same manner as when a cold chisel is repeatedly struck with a series of hammer blows.

It may be well to mention here that it is recognized that impact is the third derivative of distance with respect to time, while acceleration is only the second derivative of distance with respect to time. For this reason, the analogy of the chisel impact on the weld bead and the cutter with intermittent velocity differs by a single rate of change of distance with respect to time.

Therefore, the added milling force would not be as great as in the hammer and chisel analogy.

Figure 2:
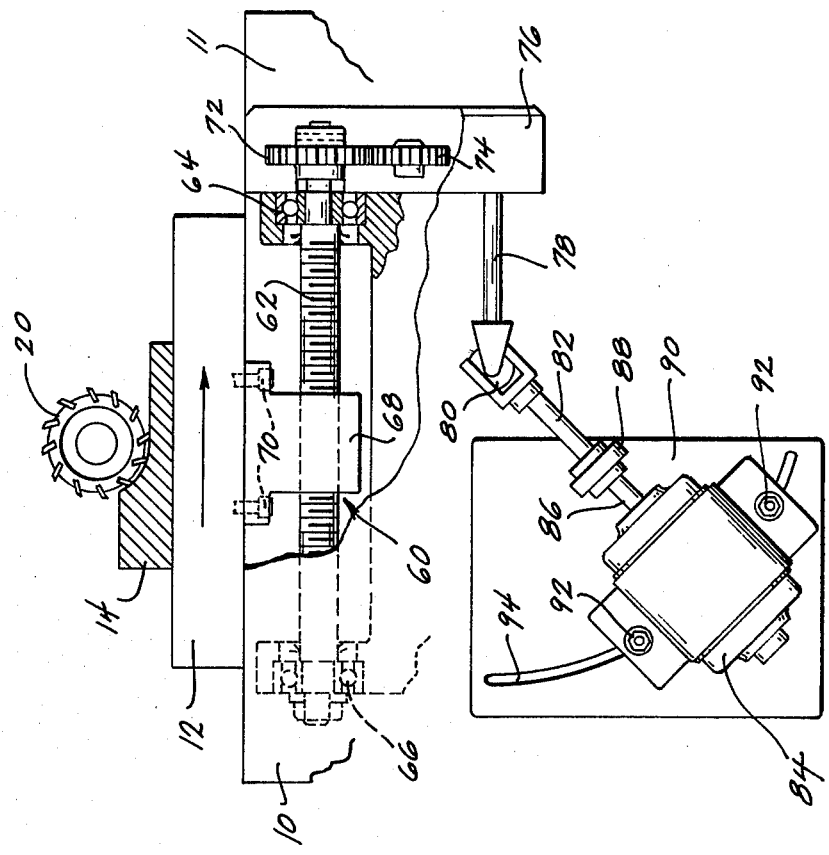
FIG. 2 is a diagrammatic front elevational view of the embodiment of FIG. 1.

The pulsating cutting force can also be attained with a constant spindle speed by periodically varying the feed rate. However, it is preferable to vary both the spindle speed and the feed rate to enhance the pulsating force and this is done in the embodiment illustrated in FIGS. 1 and 2. FIG. 1 shows the pulsating drive for the spindle while FIG. 2 shows the pulsating drive for the worktable. Referring to FIG. 2, worktable 12 is moved over ways 11 by a conventional ball screw mechanism 60 having a screw 62, which is journaled to bed 10 by bearings 64 and 66, and a nut 68, which is attached to table 12 by bolts 70. Screw 62 is driven by gears 72 and 74 which are part of a feed change gear box 76 that is driven by an input shaft 78. Input shaft 78 is also the driven shaft of a universal joint 80 which has a driver shaft 82. Shafts 78 and 82 are disposed at an angle β to each other. Shaft 82 is driven by an electric motor 84 whose shaft 86 is coupled to shaft 82 by coupling 88. Motor 84 is movably mounted on a swivel base 90 by bolts 92 which extend through an arcuate slot 94 in base 90. Motor 84 can be moved along base 90 when bolts 92 are loosened to adjust the value of the angle β.

Universal joint 80 has the same operating characteristics as are illustrated in FIGS. 3A and 3B for universal joint 44.

The pulsating force between the workpiece and cutting tool can also be obtained with elliptical gears rather than with universal joints. FIGS. 4A and 4B show how the relative radii of a pair of elliptical gears vary as they rotate, thereby causing a corresponding variation in the rotary speed of the driven gear in a single revolution thereof. In the particular example shown in FIGS. 4A and 4B, the velocity variation ratio of the gears is 9 to 1; however, any desired velocity variation ratio can be obtained by changing the dimensions of the elliptical gears.

FIGS. 5 to 10 show a modification of the embodiment of FIGS. 1 to 3B in which the pulsating drive to the input shaft 26 of speed change gear box 24 is provided by an elliptical gear train rather than by universal joints. Referring to FIG. 5, an elliptical gear 96 is rigidly attached to shaft 26 and meshes with a matching elliptical gear 98 which is attached to a splined shaft 100 by a nut 99. Gear 98 is notched to match the splines on shaft 100 and is removably secured to shaft 100 by nut 99 for reasons described below. Splined shaft 100 is journaled to frame 102 by bearings 104 and has another elliptical gear 106 attached thereto. Gear 106 is notched to match the splines on shaft 100 and is removably secured to shaft 100 by a nut 108 which can be removed to remove gear 106 to change its orientation relative to gear 98 to control the speed variation rations discussed below. Gear 106 meshes with a matching elliptical gear 110 which is rigidly attached to a shaft 112. Shaft 112 is journaled to frame 102 by bearings 114 and is coupled by coupling 116 to the drive shaft 117 of an electric motor 118.

When electric motor 118 drives shaft 112 at a constant speed, the speed of driven shaft 26 depends in part on the speed of shaft 112, in part on the dimensions of the elliptical gears, and in part on the orientation of gear 106 with respect to gear 98. When gears 106 and 98 are aligned with each other as shown in FIGS. 5 and 6, there is a maximum speed variation on pulsation for each revolution of shaft 26. However, when gears 106 and 98 are 180° out of alignment, as shown in FIGS. 7 and 8, there is no speed variation in shaft 26 since the speed variation induced by gear 106 is canceled out by an equal and opposite speed variation induced by gear 98. In the positions between alignment and 180° out of alignment for gears 106 and 98, various levels of speed variation can be obtained by adjusting the angular alignment of gear 106 with respect to gear 98 within the limitations induced by the number of splines on splined shaft 100. The actual level of speed variation available with the above-described variable speed drive train can be varied in increments which depend on the number of splines and which vary from zero to a maximum ratio of 81 to 1 in this particular example. Larger speed variation ratios can be obtained, if desired, by changing the dimensions of gears 106 and 98.

It should be noted that the speed variation ratios are multiplied between gear pairs 96 to 98 and 106 to 110. There is a speed variation ratio of 9 to 1 for each gear pair, which gives a maximum speed variation ratio of 81 to 1 for the entire gear train.

In the foregoing description, the change in the angular orientation of gears 98 and 106 was achieved by changing the angular position of gear 106. However, it will be obvious that the same effect can be obtained by changing the angular position of gear 98.

FIG. 9 shows an elliptical gear drive train coupled to the input shaft 78 of gear box 76 for varying the feed rate of worktable 12 in a pulsating manner. An elliptical gear 120 is rigidly attached to shaft 78 and meshes with a matching elliptical gear 122 which is secured to a splined shaft 124 by a nut 126. Gear 122 is notched to match the splines in shaft 124 and is removably secured thereto by nut 126. Splined shaft 124 is journaled to frame 102 by bearings 128 and has another elliptical gear 130 removably secured thereto by a nut 132. Elliptical gear 130 is notched to match the splines in shaft 124 and can be removed and re-oriented to change the relationship between gears 130 and 122. Gear 122 can also be removed and re-oriented to change the relationship between gears 130 and 122.

Elliptical gear 130 meshes with a matching elliptical gear 134 which is rigidly attached to a shaft 136. Shaft 136 is journaled to frame 102 by bearings 138 and is coupled to the output shaft 140 of an electric motor 142 by a coupling 144. When shaft 136 is rotated at a constant speed by motor 142, shaft 78 is driven at a pulsating speed as described above in connection with FIG. 5. The speed variation ratio can be adjusted in increments between zero and 81 to 1 by changing the relationship between gears 122 and 130.

Although the illustrative embodiments of the invention have been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention having now been fully explained in connection with the foregoing, I hereby claim as my invention:

1. In a machine tool having a holder adapted to hold a workpiece; a rotary cutting tool for operating on said workpiece; means for rotating said cutting tool during a work operation; and means for causing relative feeding movement between said workpiece holder and said cutting tool; the improvement comprising a motor for rotating said tool; and a universal joint coupled between said motor and said tool for alternately increasing and decreasing the rate of rotation of said cutting tool to produce a pulsating rate of rotation during the relative feeding movement between said workpiece holder and said cutting tool to improve the cutting efficiency of said machine tool.

2. A machine tool according to claim 1 wherein said universal joint has an input shaft and an output shaft, and also including means for varying the angle between said input shaft and output shaft to adjust the amount of increase and decrease in the rate of rotation of said cutter.

* * * * *